No. 770,820. PATENTED SEPT. 27, 1904.
T. B. RENNELL.
VARIABLE SPEED TRANSMISSION GEARING.
APPLICATION FILED JULY 3, 1903.
NO MODEL. 4 SHEETS—SHEET 1.
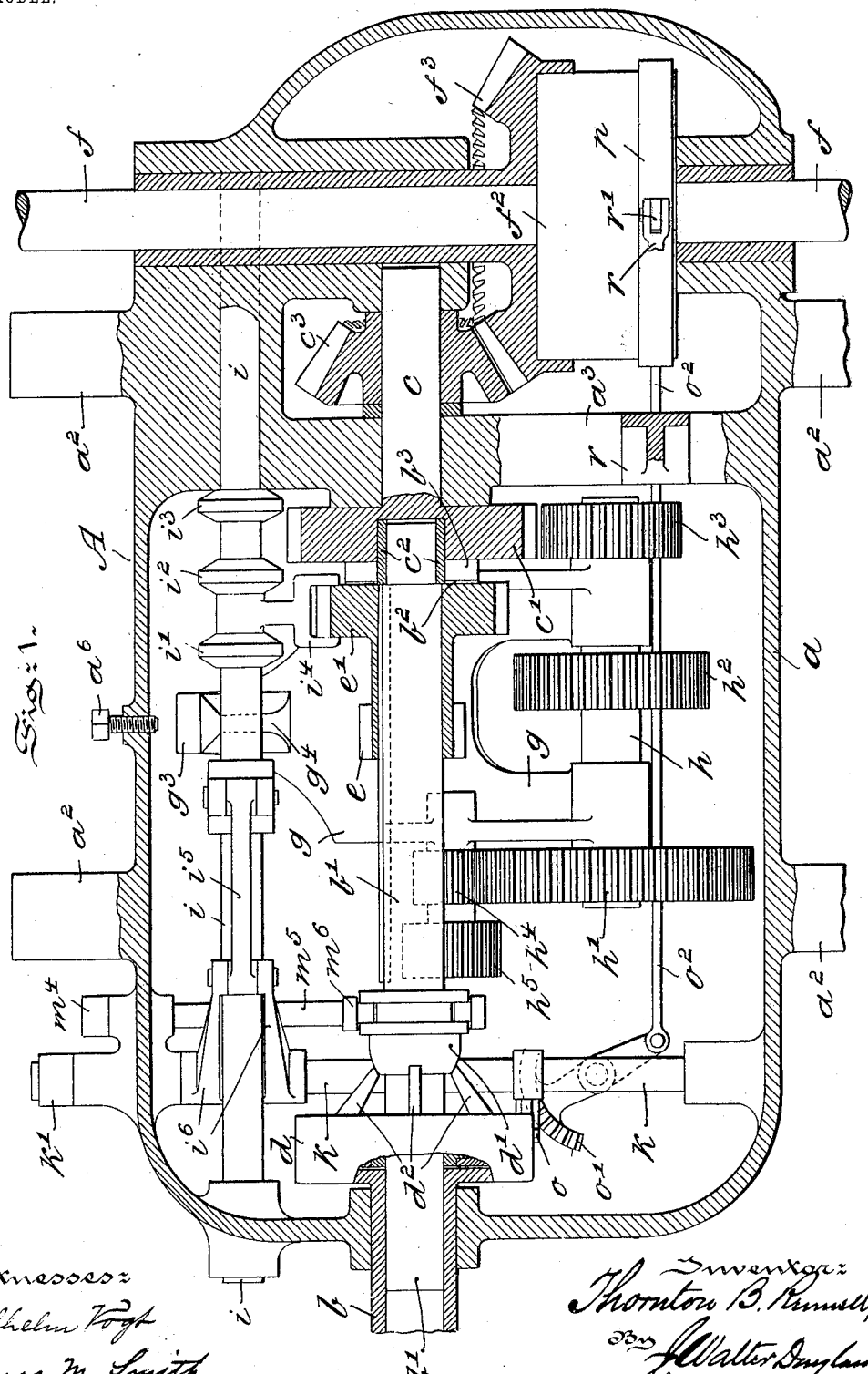

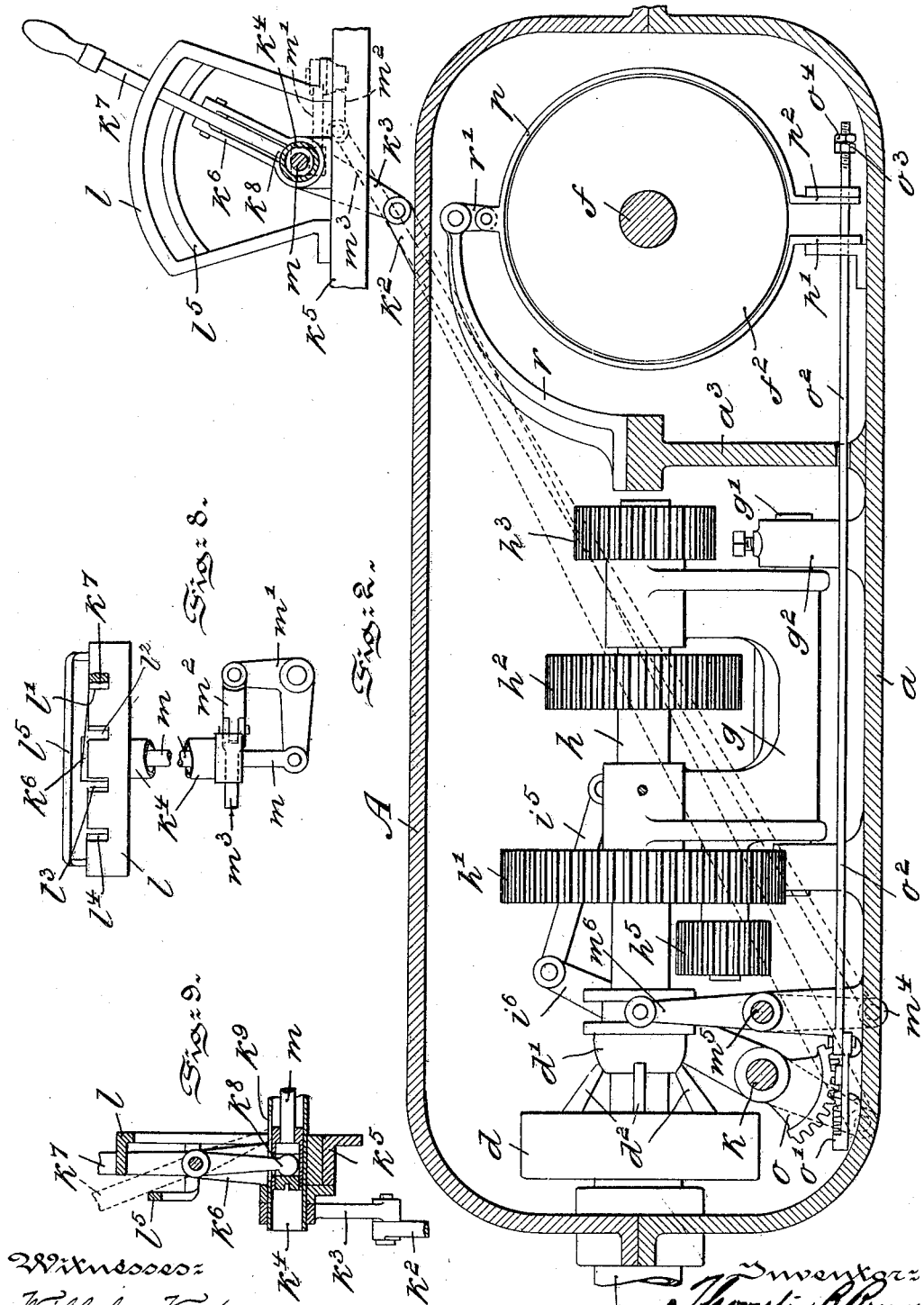

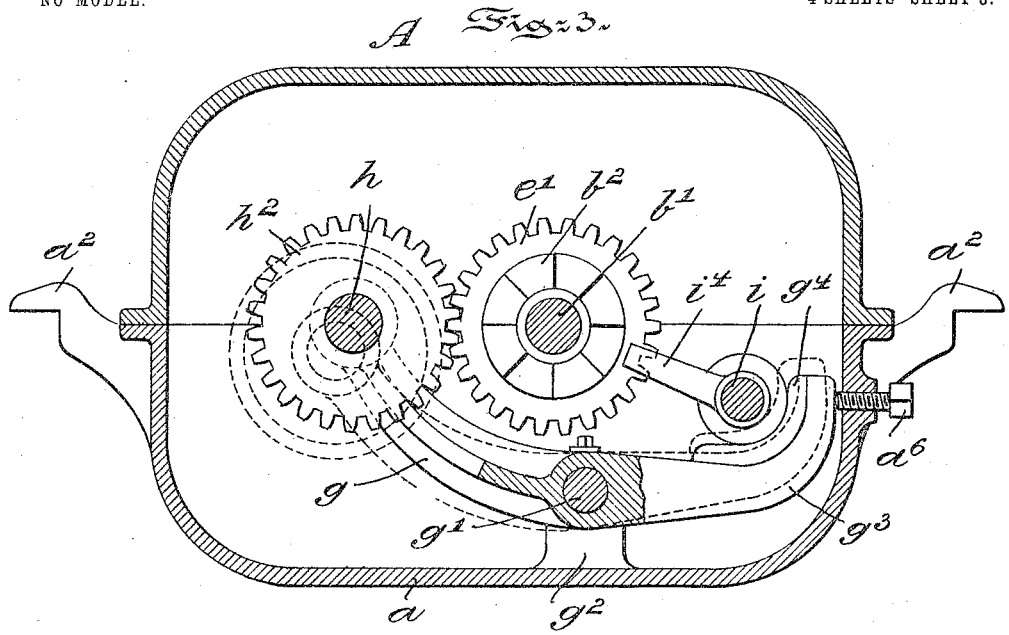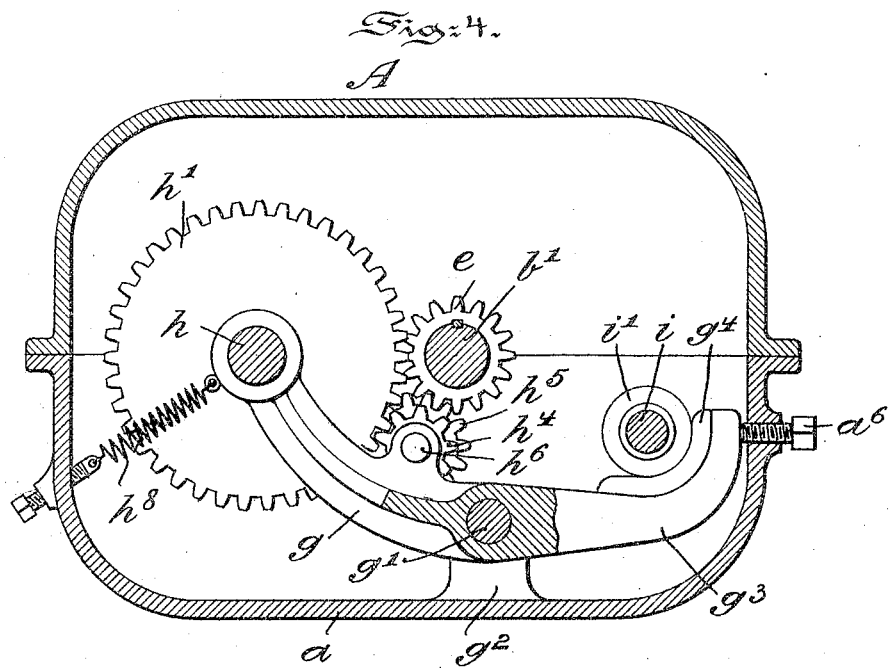

No. 770,820. PATENTED SEPT. 27, 1904.
T. B. RENNELL.
VARIABLE SPEED TRANSMISSION GEARING.
APPLICATION FILED JULY 3, 1903.
NO MODEL. 4 SHEETS—SHEET 4.
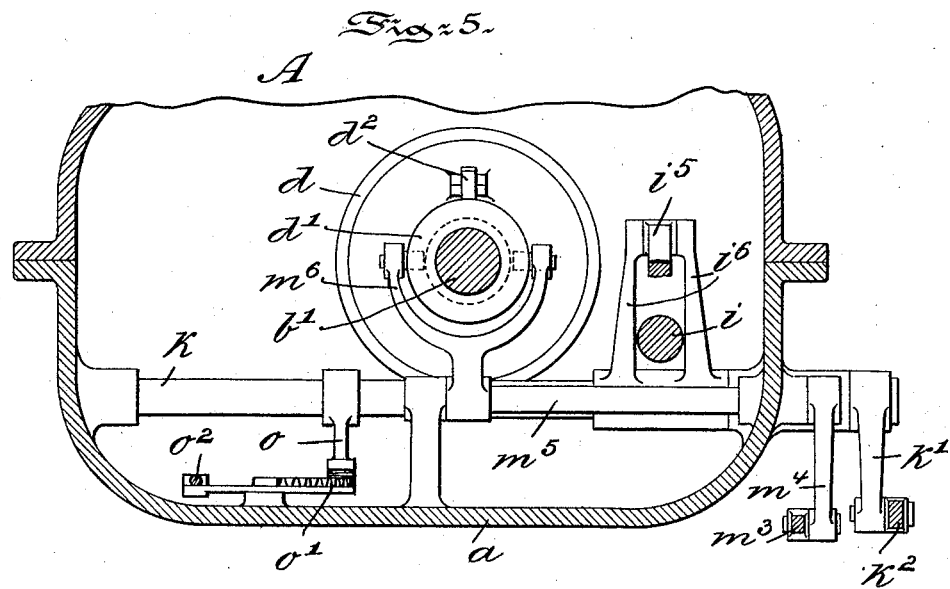
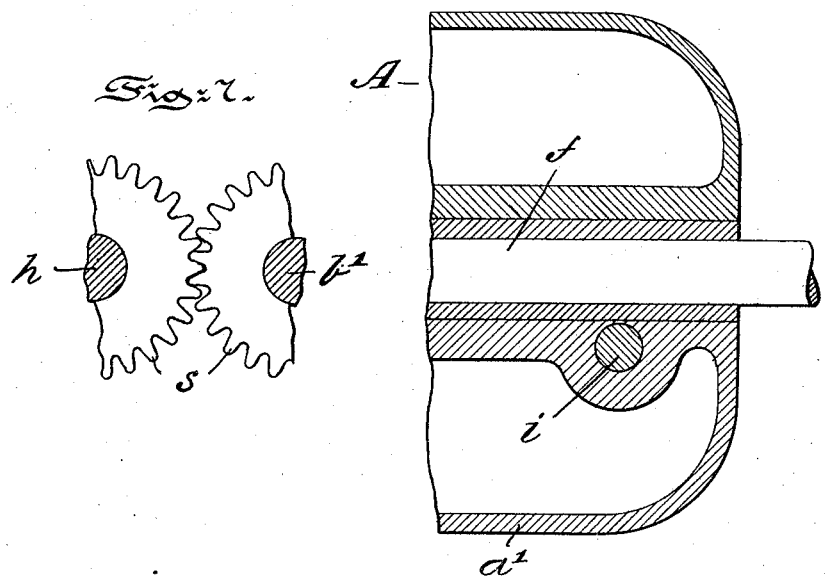

No. 770,820.

Patented September 27, 1904.

UNITED STATES PATENT OFFICE.

THORNTON B. RENNELL, OF DENVER, COLORADO.

VARIABLE-SPEED-TRANSMISSION GEARING.

SPECIFICATION forming part of Letters Patent No. 770,820, dated September 27, 1904.

Application filed July 3, 1903. Serial No. 164,119. (No model.)

*To all whom it may concern:*

Be it known that I, THORNTON B. RENNELL, a citizen of the United States, residing at the city of Denver, in the county of Denver and State of Colorado, have invented certain new and useful Improvements in Variable-Speed-Transmission Gearing, of which the following is a specification.

My invention has relation to a variable-speed-transmission gearing adapted to drive motor-vehicles, launches, or the like with varying speed in either a forward or backward direction and also applicable for use in connection with mechanism in which variable speed is required without change of the speed of the driving-shaft of such mechanism, and in such connection it relates to the general construction and arrangement of such speed-transmission gearing.

The principal objects of my invention are, first, to provide a variable-speed-transmission gearing wherein high speed is directly transmitted to the driving mechanism of a vehicle, launch, or the like without the use of intermeshing gear-wheels; second, to provide in such a gearing an oscillating counter-shaft and means to actuate the same, so as to insure at all times the meshing of the gear-wheels thereof with the gear-wheels on an auxiliary driving-shaft and a transmission-shaft by swinging these gear-wheels obliquely or in an angular path into engagement with the gear-wheels of the auxiliary driving and transmission shafts; third, to provide in such a gearing means to shift a train of sliding gear-wheels on the auxiliary driving-shaft to disengage this shaft from the transmission-shaft and to bring certain of the sliding gear-wheels opposite certain of the gear-wheels of the counter-shaft to permit when these gear-wheels are brought into engagement with each other of an intermediate transmission from the driving and auxiliary driving shafts to the counter-shaft and then to the transmission-shaft, whereby different degrees of lower speed or a reverse speed is obtained; fourth, to provide in such a gearing a sliding shaft with means adapted to control the operative position of the counter-shaft and its gear-wheels and to permit of the disengagement of these gear-wheels from the sliding gear-wheels of the auxiliary driving-shaft during the shifting thereof, and, fifth, to provide in such a gearing a brake mechanism adapted to engage the housing of a differential gearing to retard or stop the movement of a driven shaft.

The nature and scope of my invention will be more fully understood from the following description, taken in connection with the accompanying drawings, forming part hereof, in which—

Figure 1 is a top or plan view, partly sectioned, of a variable-speed-transmission gearing embodying main features of my invention. Fig. 2 is a view, partly in section and partly in elevation, illustrating an oscillating bracket carrying a counter-shaft, a brake device, and its operating mechanism, and means adapted to connect and disconnect the main driving-shaft to and from the auxiliary driving-shaft. Fig. 3 is a cross-sectional view illustrating in side elevation and in full and dotted lines the operative and inoperative positions of the counter-shaft and its gear-wheels, the oscillating bracket supporting the counter-shaft, and means adapted to actuate the bracket. Fig. 4 is a cross-sectional view illustrating in side elevation one of the sliding gear-wheels of the auxiliary driving-shaft in engagement with one gear-wheel of a set of gear-wheels carried by the oscillating bracket, the other gear-wheel of the set engaging a gear-wheel of the counter-shaft to drive the counter-shaft in reverse direction to that of the auxiliary driving-shaft. Fig. 5 is a cross-sectional view illustrating in side elevation the means for connecting and disconnecting the driving-shaft from the auxiliary driving-shaft, the means for actuating the brake mechanism, and the operating means for controlling the actuating mechanism for the oscillating bracket. Fig. 6 is a detail view illustrating in section the arrangement of the driven shaft and a sliding shaft adapted to receive and actuate the controlling mechanism for the oscillating bracket. Fig. 7 is a detail view illustrating in side elevation a modified form of gear-wheels to facilitate the meshing of the same. Fig. 8 is a detail view illustrating in top plan view a quadrant adapted to define the extent of movement of a shaft carrying controlling means for the oscillating bracket and means adapted to uncouple the main driving-shaft from the auxiliary driving-shaft during the actuation of the controlling means, and Fig. 9 is a sectional view of a portion of Fig. 8.

Referring to the drawings, A represents a sectional housing, the lower section $a$ of which is provided with laterally-projecting lugs $a^2$, which are adapted to engage the running-gear of a motor-vehicle or the framework of an engine, launch, or the like. As shown in Fig. 1, in the sectional housing A is arranged at one end a hollow shaft $b$, which is positively driven from any suitable source of power (not shown) and constitutes the main driving-shaft of the gearing. This main driving-shaft $b$ serves to support one end of an auxiliary driving-shaft $b'$, the other end of which engages a bushing $c^2$ of a gear-wheel $c'$, preferably integral with a transmission-shaft $c$, which is arranged in alinement with the main driving-shaft $b$ and auxiliary driving-shaft $b'$, and is supported by a bracket $a^3$, preferably integral with the lower section $a$ of the sectional housing A. The preferred means of connecting and disconnecting the main driving-shaft $b$ from the auxiliary driving-shaft $b'$ consists in a coupling $d$ of well-known construction, which is controlled by a coupling-cone $d'$, sliding on the auxiliary driving-shaft $b'$ and engaging coupling-fingers $d^2$. On the auxiliary shaft $b'$ is slidably arranged a train of gear-wheels $e$ and $e'$, the gear-wheel $e'$ of which is provided with one member of a coupling, $b^2$, the other member, $b^3$, thereof being integral with the gear-wheel $c'$ of the transmission-shaft $c$. This coupling forms the connecting means between the auxiliary driving-shaft $b'$ and the transmission-shaft $c$, as shown in Fig. 1, which couplings are, however, disconnected from each other as soon as the sliding train of gear-wheels $e$ and $e'$ are shifted toward the left in Fig. 1 for a purpose to be presently more fully explained. The transmission-shaft $c$ is provided with a bevel-gear $c^3$, meshing with a bevel-gear $f^3$, secured to the housing $f^2$ of a differential gearing of well-known construction, which gearing actuates the divided driven shaft $f$ in the usual manner. This arrangement of the shafts $b$, $b'$, and $c$ permits of a direct transmission of a high speed of rotation imparted to the main driving-shaft $b$, to the driven shaft $f$, and from thence to the driving mechanism of a vehicle—for instance, an automobile, where such high speed is most desired—without the intervention of gear-wheels and without incurring loss in power in such transmission.

Below the auxiliary driving-shaft $b'$ is arranged a bracket $g$, movably supported by a shaft $g'$, carried by brackets $g^2$, preferably integral with the section $a$ of the housing, as shown in Fig. 2. This bracket $g$ carries a shaft $h$, to which are secured gear-wheels $h'$, $h^2$, and $h^3$. The bracket $g$ tapers into an arm $g^3$, provided with a steel shoe $g^4$, which in the position shown in full lines in Fig. 1 and in dotted lines in Fig. 3 rests against a shaft $i$, slidably arranged in the lower section $a$ of the housing A. In this position of the bracket $g$ the gear-wheel $h^3$ thereof, arranged opposite the gear-wheel $c'$ of the transmission-shaft $c$, is held out of engagement therewith and in this manner permits the direct transmission of high speed imparted from the main driving-shaft $b$ to the driven shaft $f$.

The sliding shaft $i$ is provided with a series of cam-disks $i'$, $i^2$, and $i^3$, arranged a certain distance apart from each other and with a bracket $i^4$, adapted to engage the gear-wheel $e'$ of the sliding train of gear-wheels keyed to the auxiliary driving-shaft $b'$. As shown in Figs. 1, 2, and 5, to the shaft $i$ is pivotally secured a link $i^5$, engaged by the lever-arm $i^6$, carried by a shaft $k$, arranged in the section $a$ of the housing A. The shaft $k$, by means of a lever-arm $k'$, link $k^2$, and lever-arm $k^3$, is connected with a hollow shaft $k^4$, carried by a bracket $k^5$, to which is secured a quadrant $l$. In the instance of an automobile the quadrant $l$ is located adjacent to the seat of an operator. To the hollow shaft $k^4$ is secured a bracket $k^6$, to which is pivotally connected a lever-arm $k^7$, the lower end $k^8$ of which passes through a slot $k^9$, arranged in the hollow shaft $k^4$, and engages a rod $m$ for a purpose to be presently more fully explained. The upper end of the lever-arm $k^7$ engages notches $l'$, $l^2$, $l^3$, and $l^4$, and for this purpose has to be swung sidewise, as illustrated by dotted lines in Fig. 9, to be brought out of engagement with one of the notches and back into engagement with another notch thereof. This outward or side movement of the lever-arm $k^7$ is limited by a curved bar $l^5$, along which the lever-arm travels until the same has been brought opposite a certain notch of the quadrant $l$ and is then moved back into engagement therewith.

The lever-arm $k^7$ by being moved out of engagement with the quadrant $l$ actuates the rod $m$, arranged in the hollow shaft $k^4$, which by means of a bell-crank lever $m'$ and links $m^2$ and $m^3$ is connected with a lever-arm $m^4$, secured to a shaft $m^5$, and partially rotates the same. To the shaft $m^5$ is secured a forked arm $m^6$, which by engaging the coupling-cone $d'$ shifts the same toward the right in Fig. 1 as soon as the lever-arm $k^7$ is disengaged from the quadrant $l$. This movement of the coupling-cone $d'$ disengages the main driving-shaft $b$ from the auxiliary driving-shaft $b'$ whenever it is necessary or desirable to change the speed of a vehicle or launch or reverse the direction of travel thereof. As soon as the lever-arm $k^7$ is swung back and into engagement with one of the notches $l'$, $l^2$, $l^3$, and $l^4$ the coupling-cone $d'$ is shifted toward the left in Figs. 1 and 2 and by raising the coupling-fingers $d^2$ couples the main driving-shaft $b$ with the auxiliary driving-shaft $b'$ by the intervention of the coupling $d$. In the position of the lever-arm $k^7$ shown in Figs. 2 and 8, in which the same engages the first notch $l'$ of the quadrant $l$, the sliding or cam shaft $i$ occupies the position shown in Fig. 1, in which the steel shoe $g^4$ of the oscillating bracket $g$ rests directly against the cam-shaft $i$, and the bracket $i^4$ at the same time has shifted the gear-wheel $e'$ and its coupling member $b^2$ into engagement with the coupling member $b^3$ of the gear-wheel $c'$. In this position of the cam-shaft $i$ the gear-wheels $h'$, $h^2$, and $h^3$, mounted on the counter-shaft $h$ and carried by the oscillating bracket $g$, are lowered and held out of engagement with the train of sliding gear-wheels $e$ and $e'$, as shown by full lines in Fig. 1 and dotted lines in Fig. 3, and the auxiliary driving-shaft $b'$ and transmission-shaft $c$ being coupled together high speed is directly transmitted from the main driving-shaft $b$ to the driven shaft $f$. If the lever-arm $k^7$ is brought out of engagement with the notch $l'$ of the quadrant $l$ and shifted into engagement with the notch $l^2$ thereof, the cam-shaft $i$ is shifted toward the left in Fig. 1, and the first cam-disk $i'$ thereof is brought into engagement with the steel shoe $g^4$ of the bracket $g$, and the gear-wheel $e'$ is at the same time shifted opposite the gear-wheel $h^2$ of the counter-shaft $h$, carried by the oscillating bracket $g$. The gear-wheel $h^2$ is in this manner swung upward in an oblique direction, and thus brought into engagement with the gear-wheel $e'$ of the train of sliding gear-wheels on the auxiliary driving-shaft, the coupling member $b^2$ of which has at the same time been disengaged from the gear-wheel $c'$ of the transmission-shaft $c$. The rotation of the main driving-shaft $b$ and auxiliary driving-shaft $b'$ is now transmitted by the gear-wheels $e'$ and $h^2$, counter-shaft $h$, and gear-wheels $h^3$ and $c'$ to the transmission-shaft $c$ and by the bevel-gears $c^3$ and $f^3$ from the same and differential gear $f^2$ to the driven shaft $f$, and intermediate speed is obtained.

By disengaging the lever-arm $k^7$ from the notch $l^2$ and bringing the same into engagement with the notch $l^3$ of the quadrant $l$ the main driving-shaft $b$ is first uncoupled from the auxiliary driving-shaft $b'$, and the gear-wheels $h^2$ and $h^3$ of the bracket $g$ are lowered and disengaged from the gear-wheels $e'$ and $c'$ as soon as the cam-disk $i''$ leaves the shoe $g^4$ of the bracket $g$, which requires only a slight movement of the cam-shaft $i$. The gear-wheel $e'$ is still farther shifted toward the left in Fig. 1 until the gear-wheel $e$, integral with the gear-wheel $e'$, is shifted opposite the gear-wheel $h'$. In the meantime the second cam-disk $i^2$ has been brought into engagement with the shoe $g^4$ of the bracket $g$, and the same by being raised has brought the gear-wheel $h'$ into engagement with the gear-wheel $e$. The main driving-shaft $b$ and auxiliary driving-shaft $b'$ are now recoupled and the rotation of the main driving-shaft $b$ is transmitted from the same to the driven shaft $f$ by the gear-wheels $e$ and $h'$ to the counter-shaft $h$ of the bracket $g$ and by the same and gear-wheels $h^3$ and $c'$ to the transmission-shaft $c$ and from the same to the driven shaft $f$, and low forward speed is thus obtained.

By bringing the lever-arm $k^7$ into engagement with the notch $l^4$ of the quadrant $l$ the gear-wheel $e$ is shifted opposite a gear-wheel $h^5$, carried by a shaft $h^6$, secured to the oscillating bracket $g$. The gear-wheel $h^5$ is preferably integral with a gear-wheel $h^4$, continuously meshing with the gear-wheel $h'$, as shown in Fig. 4, and when the cam-disk $i^3$ has been brought into engagement with the bracket $g$ the direction of rotation of the main driving-shaft $b$ and auxiliary driving-shaft $b'$, by the intervention of the gear-wheels $e$, $h^5$, $h^4$, and $h'$, is reversed and the shaft $h$, transmission-shaft $c$, and the driving-shaft $f$ driven in a direction opposite to that in which the main driving-shaft $b$ and auxiliary driving-shaft $b'$ rotates.

As shown in Figs. 1, 2, and 5, to the actuating-shaft $k$ for the cam-shaft $i$ is secured a sector $o$, meshing with a sector $o'$, pivotally secured to the lower section $a$ of the housing A. To the free end of the sector $o'$ is secured a rod $o^2$, passing through the ends $p'$ and $p^2$ of a brake-band $p$, surrounding the housing $f^2$ of a differential gearing. (Not shown.) The brake-band $p$ is suspended from an arm $r$, secured to the bracket $a^3$ of the housing A by means of a link $r'$. As soon as the lever-arm $k^7$ is brought out of engagement with the notch $l^4$ of the quadrant $l$ and only slightly farther moved toward the left in Fig. 8 the cam-disk $i^3$ is brought out of engagement with the bracket $g$, which under the influence of a spring $h^8$, as shown in Fig. 4, immediately drops and brings its gear-wheel $h^5$ out of engagement with the gear-wheel $e$ of the auxiliary driving-shaft $b'$. At the same time the adjusting-nut $o^3$ of the rod $o^2$ has been brought into engagement with the end $p^2$ of the band-brake $p$, and the same is tightened on the housing $f^2$ of the differential gearing. (Not shown.) By the lowering of the bracket $g$ the rotation of the main driving-shaft $b$ and the auxiliary driving-shaft $b'$ cannot be transmitted to the transmission-shaft $c$ and driven shaft $f$, so that all the brake-power derived from the brake $p$ is exclusively utilized to retard and stop the rotation of the driven shaft $f$ and the mechanism of a vehicle actuated thereby. The adjusting-nut $o^3$ may be clamped in any position on the rod $o^2$ by a clampingnut $o^4$, as shown in Fig. 2; and in this manner the time for the actuation of the brake-band $p$ may be arranged *ad libitum*.

In order to still further facilitate the meshing of the gear-wheels of the counter-shaft $h$ and bracket $g$ with the gear-wheels of the auxiliary driving-shaft $b'$ and transmission-shaft $c$, the teeth $s$ thereof may be rounded or arched at the face and root thereof, as shown in Fig. 7 of the drawings. The housing A is provided with an adjusting-screw $a^6$, adapted to limit the downward movement of the end $g^3$ of the bracket $g$, so as to control the required engagement of the gear-wheels of the counter-shaft $h$ with the gear-wheels on the auxiliary driving-shaft $b'$ and one of the gear-wheels of the transmission-shaft $c$.

Having thus described the nature and objects of my invention, what I claim as new, and desire to secure by Letters Patent, is—

1. In a variable-speed-transmission gearing, a main driving-shaft, an auxiliary driving-shaft, a transmission-shaft and clutch mechanism for connecting the respective shafts, as described, a shaft arranged to be driven by said connected shafts, and gear-wheels arranged upon certain of the connected shafts, in combination with a swinging support, a counter-shaft with gear-wheels carried by said support, and means for oscillating said support to bring the gear-wheels of the counter-shaft into and out of mesh with the gear-wheels of the connected shafts.

2. In a variable-speed-transmission gearing, a main driving-shaft, an auxiliary driving-shaft and a transmission-shaft arranged to be connected and disconnected to and from each other, gear-wheels slidable on and fixed to certain of said connected shafts, a counter-shaft, gear-wheels arranged thereon, a bracket pivotally adapted to support said counter-shaft with its gear-wheels, and a cam-shaft having cams adapted to oscillate said bracket and to swing its gear-wheels into engagement with certain of the gear-wheels on said auxiliary driving and transmission shafts.

3. In a variable-speed-transmission gearing, a main driving-shaft, an auxiliary driving-shaft and a transmission-shaft arranged in alinement with each other, a driven shaft arranged at a right angle to said alined shafts, a counter-shaft and a cam-shaft arranged parallel to said alined shafts, gear-wheels mounted on said counter-shaft and said alined shafts normally disconnected from each other, and cams arranged on said cam-shaft adapted to swing the gear-wheels of said counter-shaft into and out of engagement with the gear-wheels of said alined shafts and to hold the same in engagement therewith.

4. In a variable-speed-transmission gearing, a driving-shaft, a driven shaft, a series of shafts interposed between said driving and driven shafts, means for connecting and disconnecting said shafts to and from each other, gear-wheels mounted on said interposed shafts, a counter-shaft arranged parallel to said interposed shafts, gear-wheels mounted thereon and adapted to engage the gear-wheels of said interposed shafts and to form in conjunction with said counter-shaft and the interposed shafts the connection between the driving-shaft and the driven shaft, when the interposed shafts are disconnected from each other, a bracket pivotally supported and adapted to carry said counter-shaft and its gear-wheels, a cam-shaft having cams both adapted to be alternately brought into and out of engagement with said bracket to swing the counter-shaft and its gear-wheels into and out of engagement with the gear-wheels on said interposed shafts, and means adapted to actuate said cam-shaft.

5. In a variable-speed-transmission gearing, a driving-shaft, a driven shaft, a series of shafts interposed between said driving and driven shafts, gear-wheels mounted on said interposed shafts, certain of the same being adapted to connect and disconnect said interposed shafts to and from each other, a counter-shaft, gear-wheels mounted thereon, a bracket adapted to support said counter-shaft and its gear-wheels and to swing the same into and out of engagement with certain of the gear-wheels on said interposed shafts, a cam-shaft, means connected with said cam-shaft adapted to engage and shift certain of the gear-wheels on one of said interposed shafts opposite certain of the gear-wheels on said counter-shaft, cams arranged on said cam-shaft, said cam-shaft and cams adapted to be alternately brought into and out of engagement with the bracket of said counter-shaft to swing certain of its gear-wheels into and out of engagement with the gear-wheels of the interposed shafts occupying a position opposite to the gear-wheels of said counter-shaft, means adapted to actuate said cam-shaft, and means adapted to retard and stop the rotation of said driven shaft.

6. In a variable-speed-transmission gearing, a hollow shaft having a bracket, a lever-arm adapted to oscillate in said bracket in a plane parallel to said shaft and to oscillate with said bracket in a plane at right angles with said shaft, means adapted to hold said lever-arm and hollow shaft in certain predetermined positions, a main driving-shaft, an auxiliary driving-shaft, a clutch adapted to connect and disconnect the same to and from each other, means adapted to connect said clutch with said lever-arm, gear-wheels of varying diameters slidably arranged on said auxiliary driving-shaft, a transmission-shaft, gear-wheels arranged thereon, one of the gear-wheels thereof and one of the slidable gear-wheels having means adapted to couple and uncouple said auxiliary driving-shaft and said transmission-shaft with each other, a driven shaft adapted to receive its motion directly from said main driving-shaft, when said auxiliary driving-shaft and said transmission-shaft are coupled with each other, a counter-shaft, gear-wheels of varying diameters arranged thereon, a cam-shaft adapted to hold said counter-shaft and its gear-wheels in an inoperative position and means connected with said cam-shaft adapted to control the position of said slidable gear-wheels on said auxiliary driving-shaft and thereby the coupling of said shaft with said transmission-shaft, cams arranged on said cam-shaft adapted to control the operative position of said counter-shaft and its gear-wheels and to hold certain of the same in engagement with certain of the gear-wheels of said auxiliary driving-shaft and said transmission-shaft to permit the transmission of power from said main driving-shaft and auxiliary driving-shaft to said counter-shaft and from the same to said transmission-shaft and driven shaft, a shaft adapted to be actuated by said hollow shaft, means connected with said cam-shaft and said actuated shaft adapted to transmit its movement to said cam-shaft and to shift the same and its cams and said slidable gear-wheels on said auxiliary shaft into certain predetermined positions, a brake adapted to engage said driven shaft and to retard and stop the movement thereof and means controlled by said actuated shaft adapted to actuate said brake.

7. In a variable-speed-transmission gearing, a driving-shaft, a driven shaft, shafts interposed between said driving and driven shafts, gear-wheels of varying diameters arranged on said interposed shafts, a counter-shaft arranged parallel to said interposed shafts, gear-wheels of varying diameters arranged thereon, a swinging bracket having its pivotal point arranged at or near its central portion adapted to support said counter-shaft and its gear-wheels, a shaft arranged parallel to said interposed shaft and adapted to normally hold said bracket and its gear-wheels out of engagement with the gear-wheels on said interposed shafts, and means arranged on said shaft adapted to engage said bracket and to swing its gear-wheels into engagement with the gear-wheels of said interposed shaft to insure the meshing of said gear-wheels with each other.

In testimony whereof I have hereunto set my signature in the presence of two subscribing witnesses.

THORNTON B. RENNELL.

Witnesses:
E. E. BRUNSON,
MAMIE E. RYAN.